United States Patent
Shuman et al.

(10) Patent No.: US 9,847,961 B2
(45) Date of Patent: Dec. 19, 2017

(54) AUTOMATIC IOT DEVICE SOCIAL NETWORK EXPANSION

(71) Applicant: QUALCOMM Incorporated, San Diego, CA (US)

(72) Inventors: Mohammed Ataur Rahman Shuman, San Diego, CA (US); Amit Goel, San Diego, CA (US); Sandeep Sharma, San Diego, CA (US); Binita Gupta, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 14/187,057

(22) Filed: Feb. 21, 2014

(65) Prior Publication Data

US 2014/0244768 A1    Aug. 28, 2014

Related U.S. Application Data

(60) Provisional application No. 61/769,157, filed on Feb. 25, 2013.

(51) Int. Cl.
*G06F 15/16* (2006.01)
*H04L 12/58* (2006.01)
(Continued)

(52) U.S. Cl.
CPC .......... *H04L 51/32* (2013.01); *G06Q 10/06* (2013.01); *G06Q 50/01* (2013.01); *H04W 4/005* (2013.01);
(Continued)

(58) Field of Classification Search
CPC ...... H04L 51/32; H04W 4/005; H04W 4/008; H04W 4/023; H04W 4/028; H04W 4/08;
(Continued)

(56) References Cited

U.S. PATENT DOCUMENTS

| 7,379,963 B1 | 5/2008 | Khare et al. |
| 2007/0037513 A1* | 2/2007 | Bellamy ................. H04L 51/04 455/3.04 |

(Continued)

FOREIGN PATENT DOCUMENTS

| CN | 102130773 A | 7/2011 |
| CN | 102687486 A | 9/2012 |

(Continued)

OTHER PUBLICATIONS

International Search Report and Written Opinion—PCT/US2014/018210—ISA/EPO—Oct. 7, 2014.

(Continued)

*Primary Examiner* — David Lazaro
*Assistant Examiner* — Berhanu Shitayewoldetsad
(74) *Attorney, Agent, or Firm* — Muncy, Geissler, Olds & Lowe, P.C.

(57) ABSTRACT

The disclosure generally relates to Internet of Things (IoT) device social networking, and in particular to an IoT device publish-subscribe messaging model and automatic IoT device social network expansion. For example, IoT devices from different networks may publish status data that relates to certain topics, wherein the published status updates may be managed in a distributed manner at each IoT network. Furthermore, IoT devices interested in published data can subscribe to data relating to certain topics, which may be used to dynamically adjust actions that the subscribing IoT devices may take. Furthermore, IoT devices can employ common social networking capabilities (e.g., refer, follow, like, publish, subscribe, etc.) to interact with other IoT devices and find relevant information from other IoT devices that can be used to improve performance and effectiveness.

22 Claims, 11 Drawing Sheets

(51) Int. Cl.
*H04W 4/00* (2009.01)
*H04W 4/08* (2009.01)
*H04W 4/20* (2009.01)
*G06Q 50/00* (2012.01)
*G06Q 10/06* (2012.01)
*H04W 4/02* (2009.01)

(52) U.S. Cl.
CPC ............. *H04W 4/08* (2013.01); *H04W 4/206* (2013.01); *H04W 4/008* (2013.01); *H04W 4/023* (2013.01); *H04W 4/028* (2013.01)

(58) Field of Classification Search
CPC .................. H04W 4/206; G06F 17/273; G06F 17/30386; G06F 17/3043; G06F 21/6218; G06F 3/04817; G06F 3/0482; G06Q 10/06; G06Q 50/01
USPC ....... 709/206, 204, 217, 224, 225–245, 207, 709/209
See application file for complete search history.

(56) References Cited

U.S. PATENT DOCUMENTS

| | | | | |
|---|---|---|---|---|
| 2008/0046878 | A1* | 2/2008 | Anderson | G06F 8/68 717/168 |
| 2008/0228813 | A1* | 9/2008 | Weiss | G06Q 30/02 |
| 2009/0249451 | A1* | 10/2009 | Su | G06F 17/30867 726/5 |
| 2010/0029211 | A1* | 2/2010 | Teague | H04W 52/243 455/63.1 |
| 2010/0070758 | A1* | 3/2010 | Low | H04W 4/08 713/155 |
| 2010/0228767 | A1 | 9/2010 | Slinker et al. | |
| 2011/0161478 | A1 | 6/2011 | Formo et al. | |
| 2012/0028606 | A1 | 2/2012 | Bobotek | |
| 2012/0197856 | A1 | 8/2012 | Banka et al. | |
| 2012/0303746 | A1* | 11/2012 | Yu | H04L 67/12 709/217 |
| 2013/0042244 | A1* | 2/2013 | Li | H04L 67/34 718/100 |
| 2013/0227114 | A1* | 8/2013 | Vasseur | H04L 41/044 709/224 |
| 2014/0189080 | A1* | 7/2014 | Dixon | H04L 65/1073 709/221 |
| 2014/0244768 | A1 | 8/2014 | Shuman et al. | |
| 2014/0244834 | A1 | 8/2014 | Guedalia et al. | |

FOREIGN PATENT DOCUMENTS

| | | |
|---|---|---|
| CN | 102761581 A | 10/2012 |
| EP | 2547040 A1 | 1/2013 |
| TW | 201233223 A | 8/2012 |

OTHER PUBLICATIONS

Guo B., et al., "From the internet of things to embedded intelligence," 2012, pp. 1-29.
Gubbi J., et al., "Internet of Things (IoT): A Vision, Architectural Elements, and Future Directions," 2012, pp. 1-19.
Kranz M., et al., "Things That Twitter: Social Networks and the Internet of Things," 2010, 10 pages.
Perera C., et al., "Context Aware Computing for the Internet of Things: A Survey," IEEE Communications Surveys & Tutorials, 2013, 41 pages.
Vavassori S., et al., "Explicit Context Matching in Content-Based Publish/Subscribe Systems," Sensors, 2013, vol. 13 (3), pp. 2945-2966.
Taiwan Search Report—TW103106296—TIPO—Aug. 11, 2015.
Taiwan Search Report—TW103106296—TIPO—Feb. 22, 2016.
Supplementary European Search Report—EP14709838—Search Authority—The Hague—Sep. 28, 2016.
Taiwan Search Report—TW105126944—TIPO—Jun. 6, 2017.

* cited by examiner

AUTOMATIC IOT DEVICE SOCIAL NETWORK EXPANSION

CROSS-REFERENCE TO RELATED APPLICATIONS

The present Application for Patent claims the benefit of Provisional Patent Application No. 61/769,157 entitled "IOT DEVICE SOCIAL NETWORKING," filed Feb. 25, 2013, and assigned to the assignee hereof and hereby expressly incorporated herein by reference in its entirety.

TECHNICAL FIELD

Various embodiments described herein are directed to Internet of Things (IoT) device social networking, and in particular to a distributed IoT device publish-subscribe messaging model and automatic IoT device social network expansion.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to various aspects described herein, the disclosure generally relates to Internet of Things (IoT) device social networking, and in particular to an IoT device publish-subscribe messaging model and automatic IoT device social network expansion. For example, IoT devices from different networks may publish status data that relates to certain topics, which may be managed in a distributed manner at each IoT network. Furthermore, IoT devices interested in published data can subscribe to data relating to certain topics, which may be used to dynamically adjust actions that the subscribing IoT devices may take. Furthermore, IoT devices can employ common social networking capabilities (e.g., refer, follow, like, publish, subscribe, etc.) to interact with other IoT devices and find relevant information from other IoT devices that can be used to improve performance and effectiveness.

According to one exemplary aspect, the IoT device publish-subscribe messaging model may form IoT devices in proximity to one other (e.g., based on location, time, or other suitable contexts) into various IoT networks that may connect to one another directly or indirectly through an appropriate communication network (e.g., the Internet). In one embodiment, IoT devices within a particular IoT network may publish status updates that relate to certain topics to the outside world (e.g., over the Internet or to another directly connected IoT network), wherein an IoT device from another network interested in published data can subscribe to one or more relevant topics and thereby receive regular status updates. As such, the subscriptions to data published from other IoT devices can be used to dynamically adjust actions or other suitable decisions that the subscribing IoT devices may initiate. Furthermore, in one embodiment, the status data that certain IoT devices publish may be managed in a distributed manner within each IoT network, which may provide the publish-subscribe messaging model with scalability that can accommodate substantial numbers of IoT devices (e g, millions or more). Additionally, IoT devices may use the publish-subscribe messaging model to discover other IoT devices that publish relevant information based on related information that may be known a-priori (e.g., an IoT vehicle device may know a travel route in advance and therefore discover other IoT devices that publish information relevant to the known travel route).

According to another exemplary aspect, a framework to automatically expand an IoT device social network may enable IoT devices to interact with one another and follow other IoT devices to find relevant information from other IoT devices that may be used to improve performance and effectiveness. For example, in one embodiment, a new IoT device added to a home network may be provisioned with a trusted relationship and another IoT device associated with the trusted relationship (e.g., a trusted manager or group owner IoT device paired with the new IoT device) may refer the new IoT device to one or more IoT devices within the home network. As such, new IoT device members can automatically expand a social network in a secure and trusted manner based on permission, need, or other criteria. Furthermore, in one embodiment, IoT devices may receive referrals to one or more external networks (e.g., from a "doorkeeper" IoT device) and thereby follow other IoT devices in the home network and/or the external networks. For example, in one embodiment, an IoT device that follows another IoT device may subscribe to certain events, status updates, environmental data, or other suitable information that the other IoT device may publish. Accordingly, rather than manually configuring communication interfaces between different IoT devices that may need to interact, an IoT device can be introduced to one IoT device (e.g., the manager and/or doorkeeper) and then use common social networking capabilities to automatically expand the social network that may be used to find relevant information.

According to another exemplary aspect, a method for supporting social networking among IoT devices may comprise, among other things, registering a new IoT device on a home IoT network having at least one trusted IoT device, receiving a referral to one or more relevant IoT devices from the at least one trusted IoT device, and subscribing to messages published from the one or more relevant IoT devices (e.g., devices located in the home IoT network, an external IoT network directly connected to the home IoT network, an external IoT network indirectly connected to the home IoT network through one or more intermediate networks, etc.), wherein the at least one trusted IoT device provides the referral to the new IoT device based one or more attributes associated with the new IoT device in response to the new IoT device registering on the home IoT network. Additionally, in one embodiment, the method may further comprise receiving the messages published from the one or more relevant IoT devices, wherein the published messages may be received from the relevant IoT devices, a manager IoT device that routes the published messages to subscribing IoT devices within the home IoT network, or any suitable combination thereof. In a similar respect, the method may comprise publishing one or more messages associated with certain topics that may be relevant to the attributes associated with the new IoT device, wherein the new IoT device may publish the messages using a local interface, a remote interface associated with a manager IoT device that routes the published messages to subscribing IoT devices within the home IoT network and external IoT networks, or any suitable combination thereof.

According to another exemplary aspect, the method may further comprise determining the relevant IoT devices based on a correlation between the attributes associated with the new IoT device and topics associated with the messages published from the one or more relevant IoT devices, discovering additional IoT devices having a friend relationship with the one or more relevant IoT devices, and subscribing to messages published from the one or more additional IoT devices. Further still, additional IoT devices that publish messages associated with certain topics that may be relevant to a current or planned state associated with the new IoT device may be discovered such that the new IoT device may subscribe to messages published from the one or more additional IoT devices. As such, in one embodiment, the method may further comprise adjusting one or more actions associated with the new IoT device based on the messages published from the one or more relevant IoT devices and/or employing social network features to expand, contract, or otherwise manage relationships among IoT devices. For example, in one embodiment, the method may further comprise referring additional IoT devices registered on the home IoT network to the new IoT device based on a correlation between the one or more attributes associated with the new IoT device and one or more attributes associated with the one or more additional IoT devices and publishing one or more messages associated with one or more topics that are relevant to the one or more attributes associated with the new IoT device, wherein the one or more additional IoT devices referred to the new IoT device subscribe to and receive the one or more messages published from the new IoT device. In another example, the new IoT device may unsubscribe from the messages published from the relevant IoT devices, identify one or more of the additional IoT devices referred to the new IoT device that are subscribed to the messages published from the relevant IoT devices, and recommend that the identified one or more additional IoT devices unsubscribe from the messages published from the relevant IoT devices.

According to another exemplary aspect, an apparatus may comprise means for registering on a home IoT network having at least one trusted IoT device, means for receiving a referral to one or more relevant IoT devices from the at least one trusted IoT device, wherein the at least one trusted IoT device provides the referral based one or more attributes associated with the apparatus in response to the apparatus registering on the home IoT network, and means for subscribing to messages published from the one or more relevant IoT devices. In addition, the apparatus may further comprise means for receiving the published messages from one or more of the relevant IoT devices or a manager IoT device that routes the published messages to subscribing IoT devices within the home IoT network and means for adjusting one or more actions based on the messages published from the one or more relevant IoT devices. Furthermore, in one embodiment, the apparatus may comprise means for publishing one or more messages associated with one or more topics that are relevant to the one or more attributes.

According to another exemplary aspect, an IoT device may comprise, among other things, a communication interface configured to communicate with at least one trusted IoT device on a home IoT network during a process to register the IoT device on the home IoT network and one or more processors configured to receive a referral to one or more relevant IoT devices from the at least one trusted IoT device and subscribe to messages published from the one or more relevant IoT devices, wherein the at least one trusted IoT device provides the referral based one or more attributes associated with the IoT device and in response to the IoT device registering on the home IoT network.

According to another exemplary aspect, a computer-readable storage medium may have computer-executable instructions recorded thereon, wherein executing the computer-executable instructions on an IoT device may cause the IoT device to communicate with at least one trusted IoT device on a home IoT network during a process to register the IoT device on the home IoT network, receive a referral to one or more relevant IoT devices from the at least one trusted IoT device, wherein the at least one trusted IoT device provides the referral to the new IoT device based one or more attributes associated with the new IoT device in response to the new IoT device registering on the home IoT network, and subscribe to messages published from the one or more relevant IoT devices.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device, according to various aspects of the disclosure, while

DETAILED DESCRIPTION

Figure 1A:
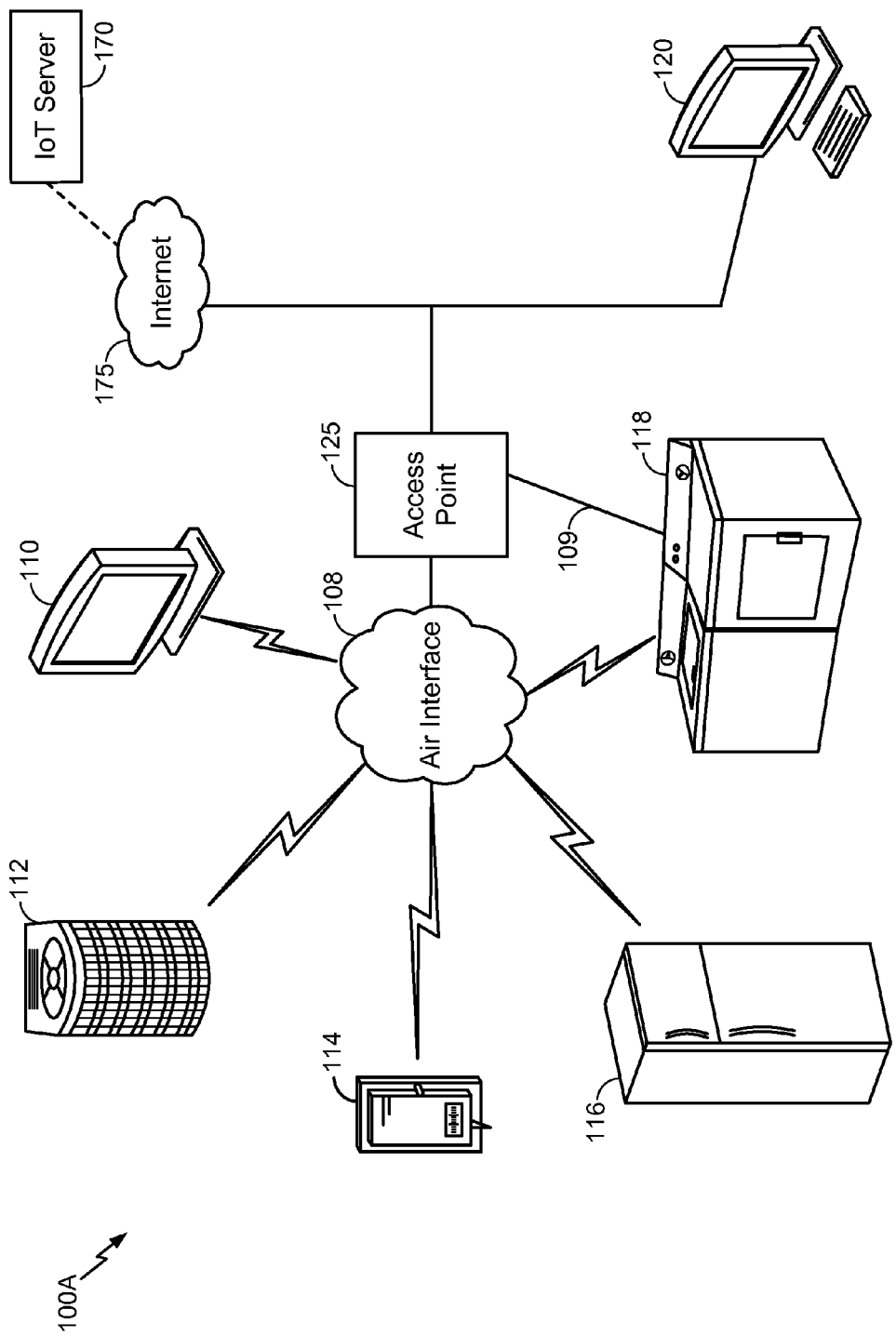
FIGS. 1A-1E illustrates exemplary high-level system architectures of a wireless communications system, according to various aspects of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
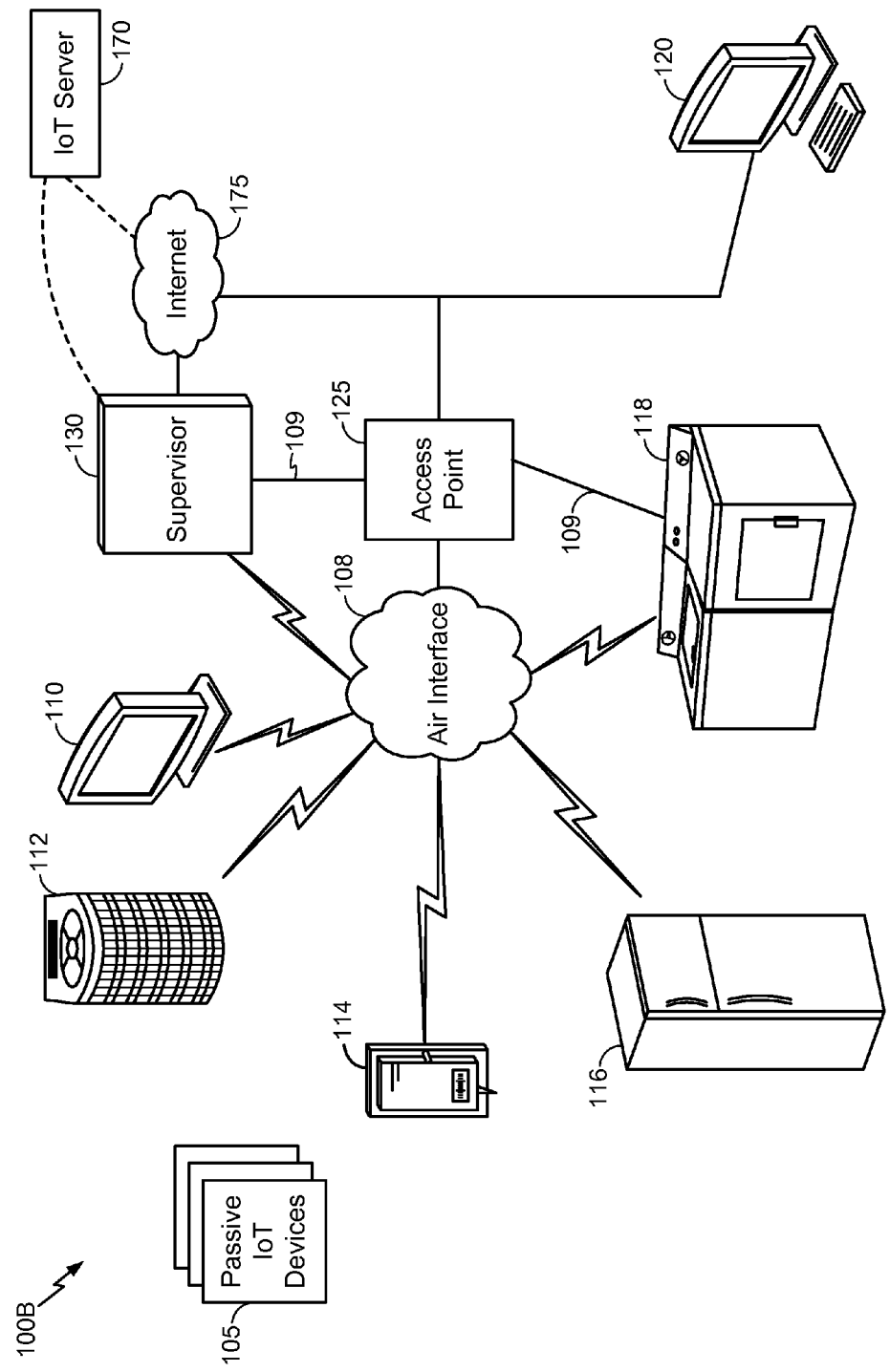

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
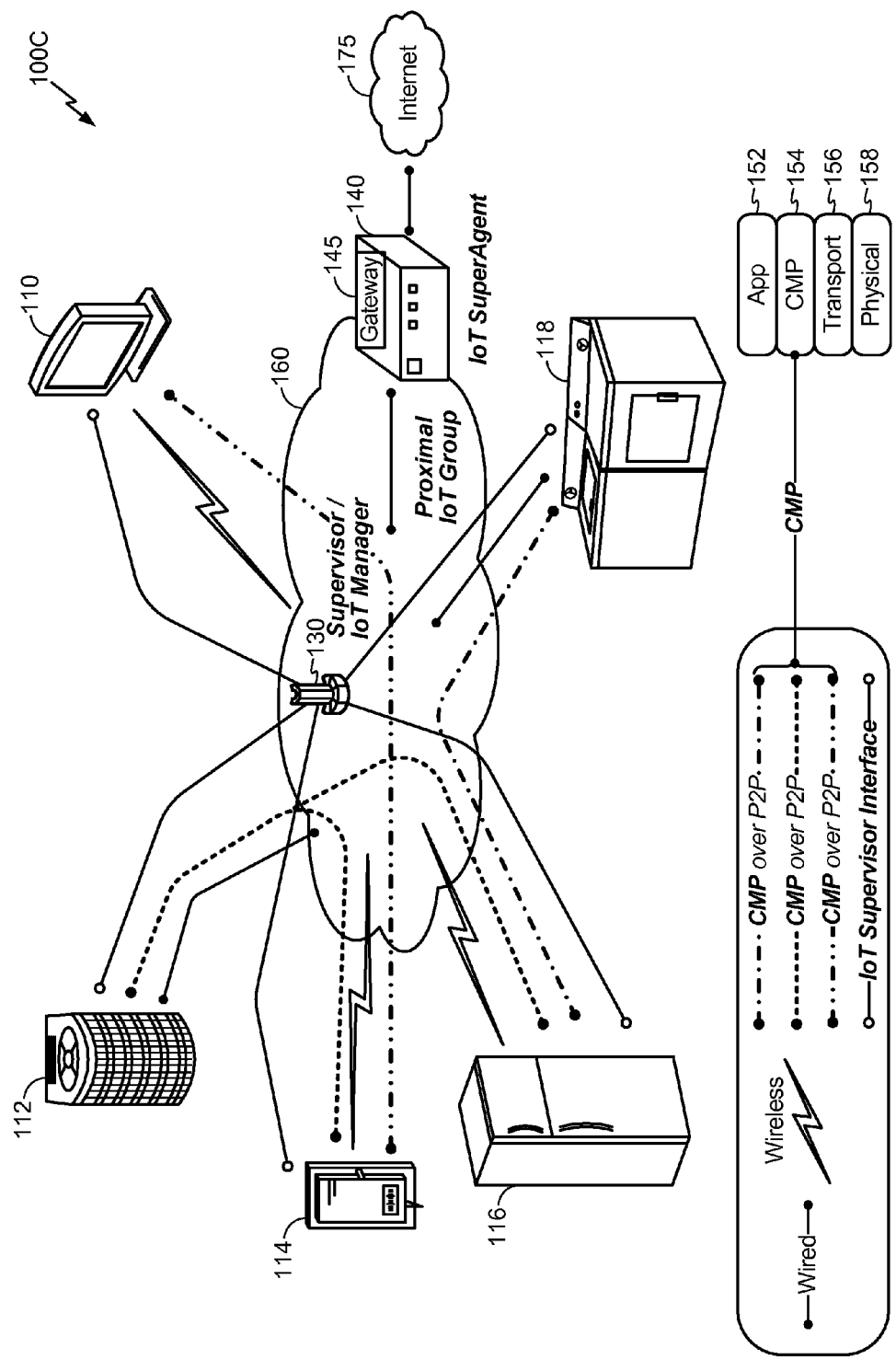

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
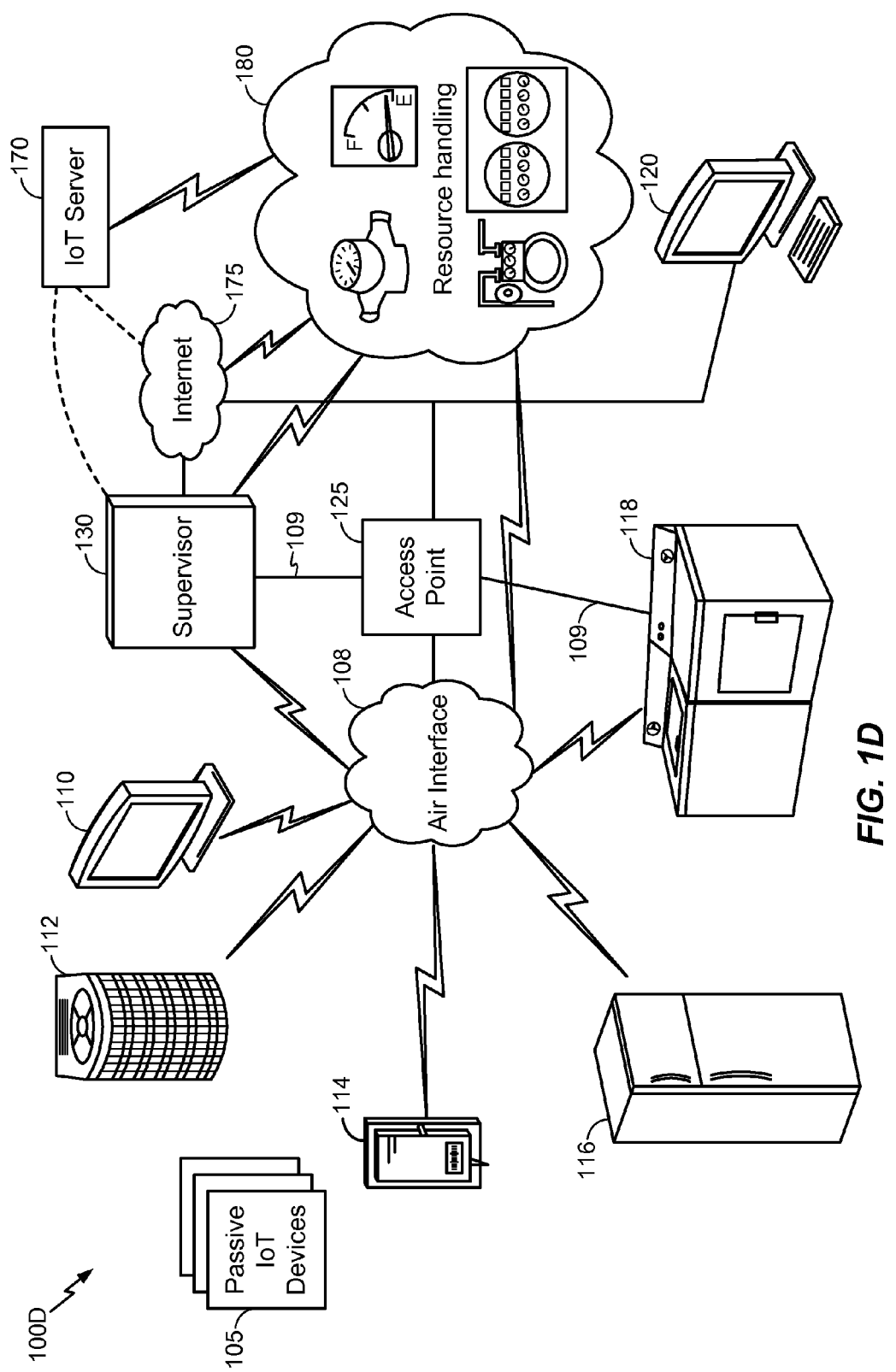

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-100C shown in FIGS. 1A-1C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-100C illustrated in FIGS. 1A-1C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
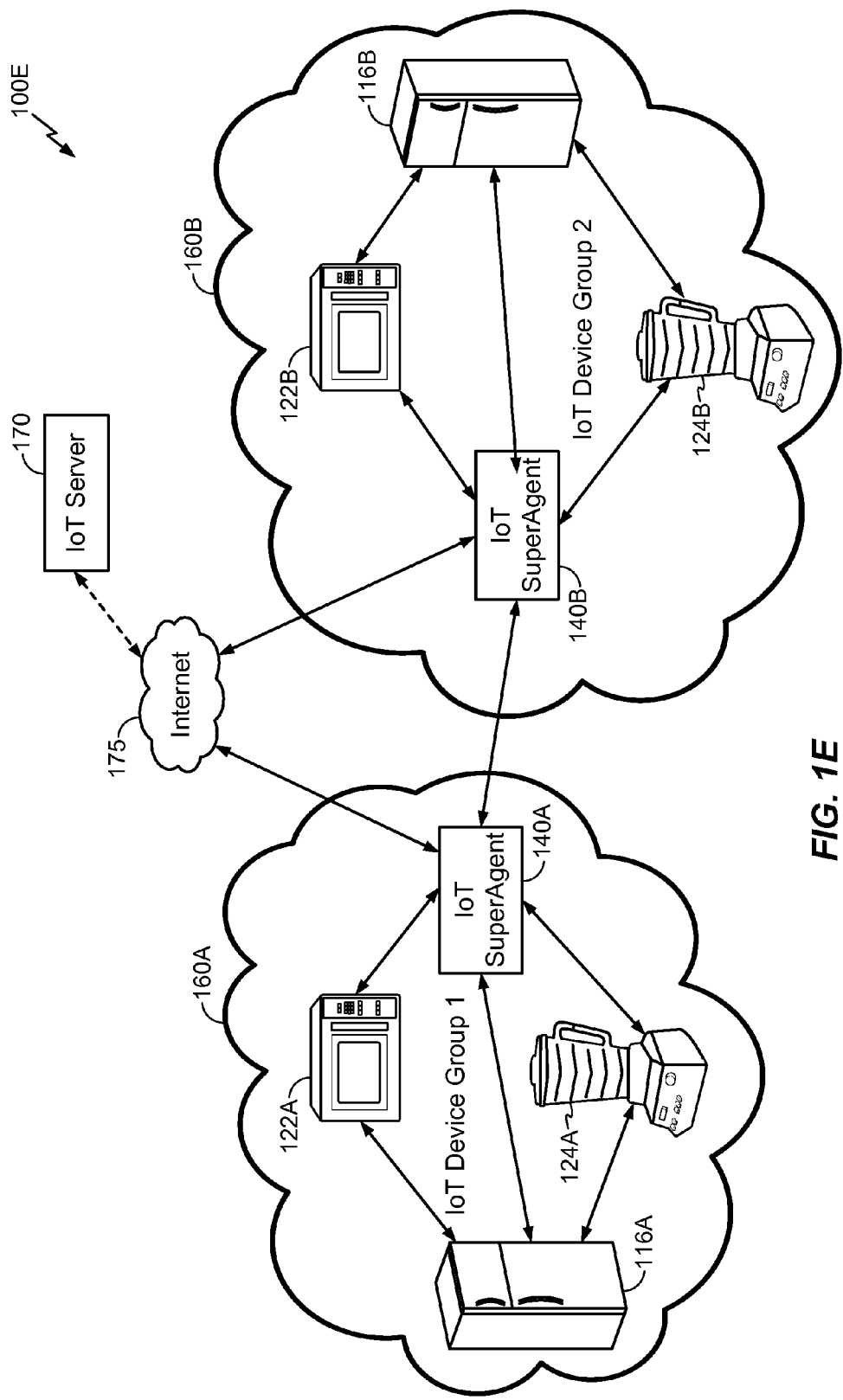

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-100D shown in FIGS. 1A-1D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-100D illustrated in FIGS. 1A-1D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

In one embodiment, the wireless communications systems 100A-100E shown in FIGS. 1A-E may further support a publish-subscribe messaging model and mechanisms to automatically expand a social network associated with the various IoT devices 110-120. For example, IoT devices 110-120 from different networks, IoT device groups 160, and/or other IoT device subdivisions may publish status data that relates to certain topics, which may be managed in a distributed manner at each IoT network. Furthermore, IoT devices 110-120 interested in published data can subscribe to data relating to certain topics, which may be used to dynamically adjust actions that the subscribing IoT devices 110-120 may take. Furthermore, IoT devices 110-120 can employ common social networking capabilities (e.g., refer, follow, like, publish, subscribe, etc.) to interact with other IoT devices 110-120 and find relevant information from other IoT devices 110-120 to improve performance and effectiveness.

For example, in one embodiment, the IoT server 170, the supervisor device 130, or another suitable entity within the wireless communication systems 100A-100E may form IoT devices 110-120 in proximity to one other (e.g., based on location, time, or other suitable contexts) into various IoT networks, IoT device groups 160, and/or other IoT device subdivisions, which may use the publish-subscribe messaging model to connect to one another directly or indirectly through an appropriate communication network (e.g., the Internet 175). As such, in one embodiment, IoT devices 110-120 within a particular IoT network, IoT device group 160, and/or other IoT device subdivision may publish status updates that relate to certain topics to the outside world (e.g., over the Internet 175 or to another directly connected IoT network, IoT device group 160, etc.), wherein an IoT device 110-120 from another network that may be interested in published data can subscribe to one or more relevant topics and thereby receive regular status updates. As such, the subscriptions to data published from other IoT devices 110-120 can be used to dynamically adjust actions or other suitable decisions that the subscribing IoT devices 110-120 may initiate. Furthermore, in one embodiment, the status data that certain IoT devices 110-120 publish may be managed in a distributed manner within each IoT network, IoT device group 160, and/or other IoT device subdivision (e.g., under control of the IoT server 170, the supervisor device 130, the IoT SuperAgents 140B, etc.), which may provide the publish-subscribe messaging model with scalability that can accommodate substantial numbers of IoT devices 110-120 (e.g., millions or more). Additionally, IoT devices 110-120 may use the publish-subscribe messaging model to discover other IoT devices 110-120 that publish relevant information based on related information that may be known a-priori (e.g., an IoT vehicle device may know a travel route in advance and therefore discover other IoT devices 110-120 that publish information relevant to the known travel route).

Furthermore, in one embodiment, the publish-subscribe messaging model may operate in a framework that can automatically expand social networks associated with the IoT devices 110-120 and thereby enable the IoT devices 110-120 to interact with and follow one another to find relevant information that may improve performance and effectiveness. For example, in one embodiment, a new IoT device 110-120 added to a home IoT network may be introduced to another device having a "trusted" status (e.g., the IoT server 170, the supervisor device 130, the IoT SuperAgent 140 within a particular IoT device group 160 that the new IoT device 110-120 may join, a trusted manager or owner in an IoT device group 160 that may be paired with the new IoT device 110-120, etc.). As such, the "trusted" device may then refer the new IoT device 110-120 to one or more IoT devices 110-120 within the home network and receive referrals to one or more external networks (e.g., from a "doorkeeper" IoT device 110-120), whereby new IoT device 110-120 members can follow other IoT devices 110-120 in the home network and/or the external networks in order to automatically expand the social network associated therewith in a secure and trusted manner based on permission, need, or other criteria. For example, in one embodiment, an IoT device 110-120 that follows another IoT device 110-120 may subscribe to certain events, status updates, environmental data, or other suitable information that the other IoT device 110-120 may publish. Accordingly, rather than manually configuring communication interfaces between different IoT devices 110-120 that may need to interact, an IoT device 110-120 can be introduced to one IoT device 110-120 (e.g., the manager, doorkeeper, or other trusted device) and then use common social networking capabilities to automatically expand the social network that may be used to find relevant information.

Figure 2A:
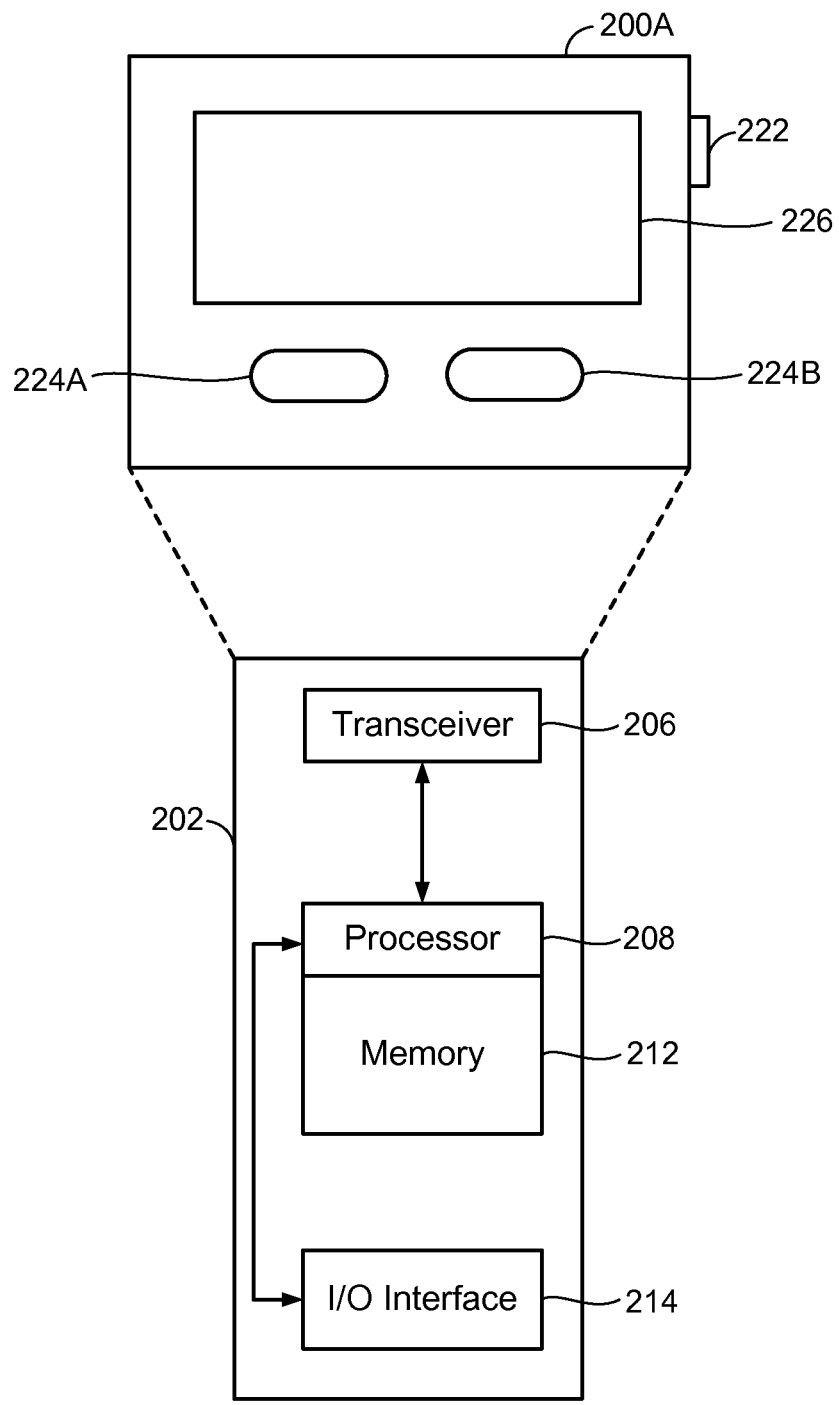

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
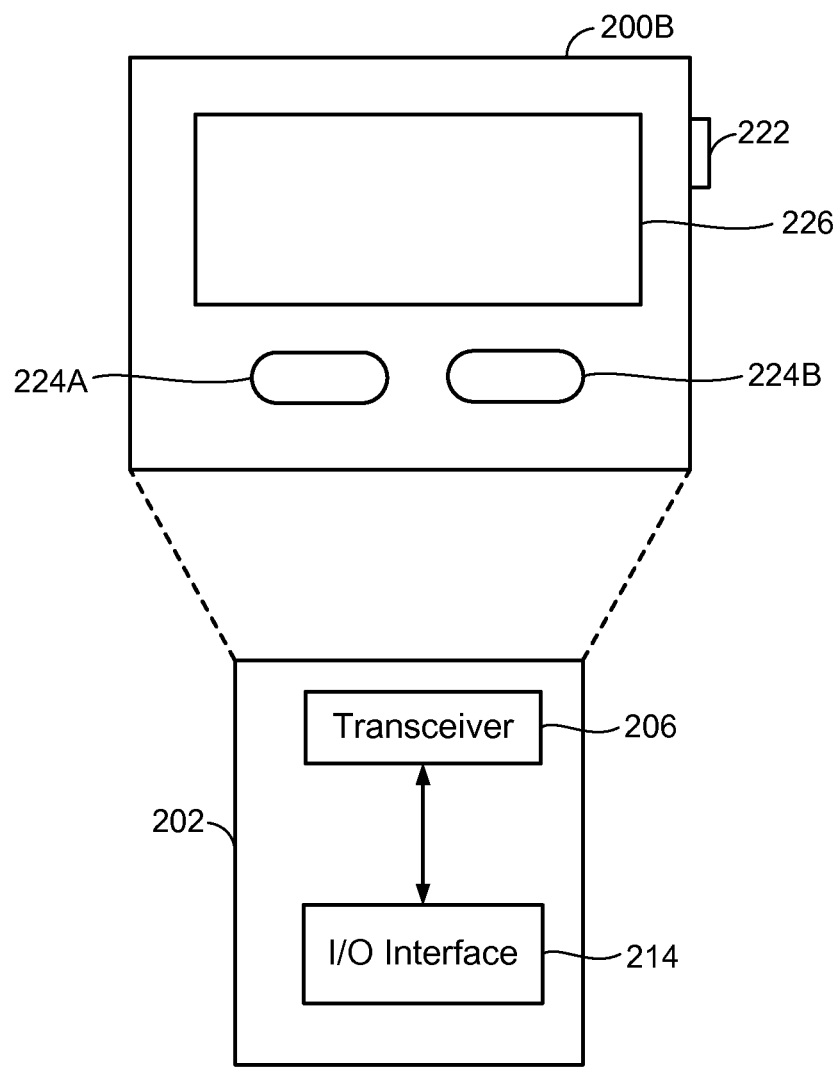
FIG. 2B illustrates an exemplary passive IoT device, according to various aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
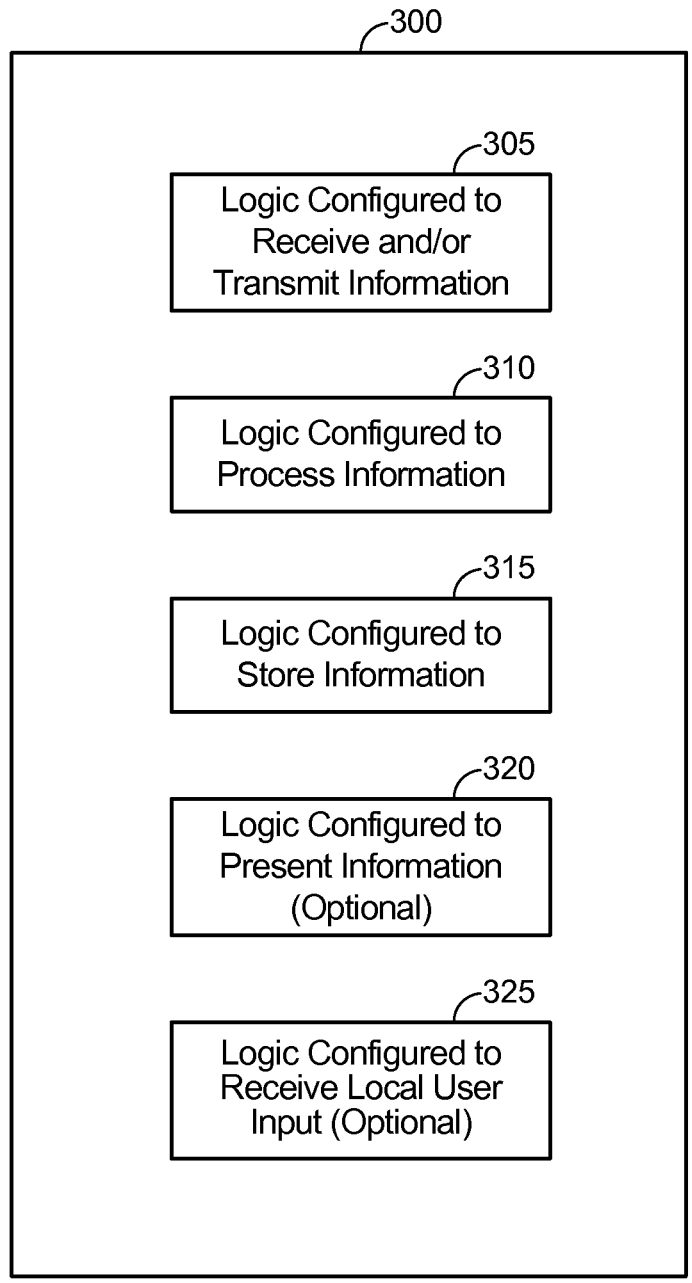
FIG. 3 illustrates an exemplary communication device that includes logic configured to perform functionality, according to various aspects of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein.

A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
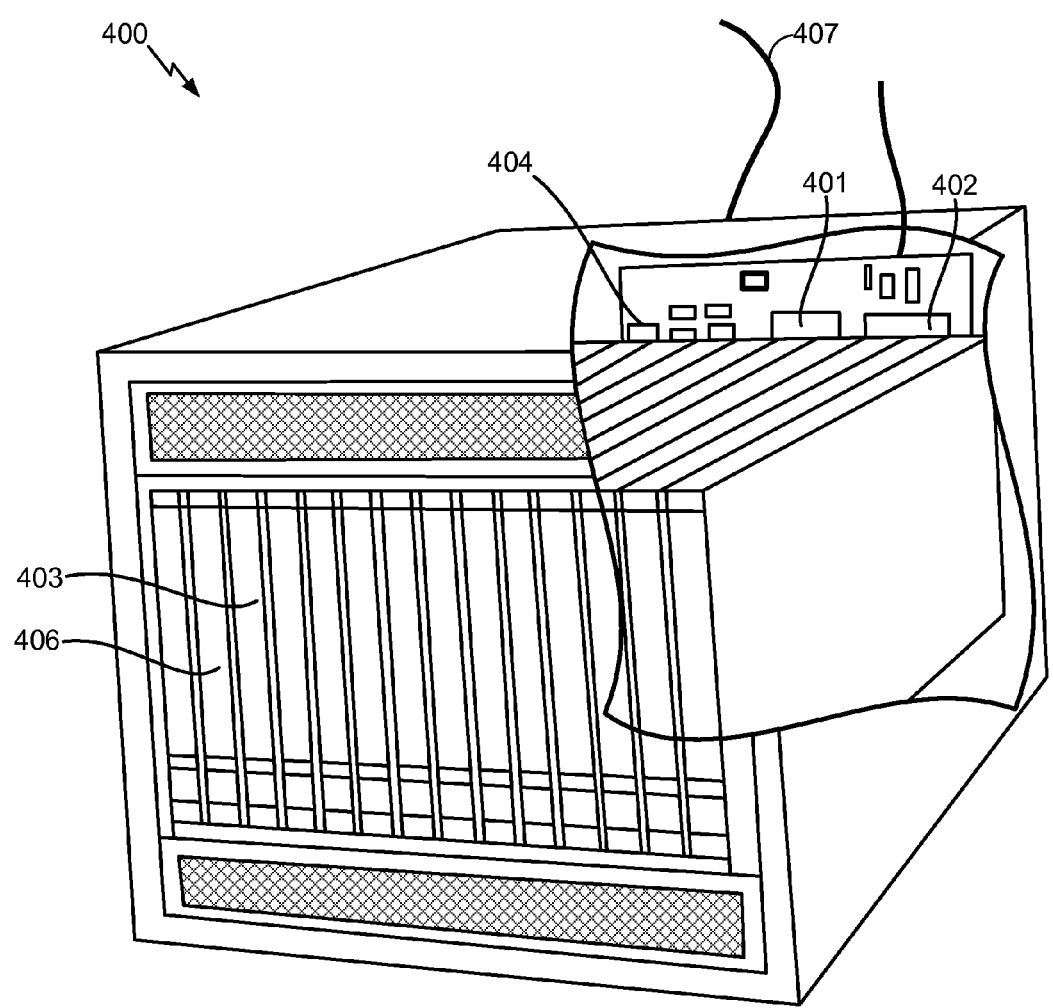
FIG. 4 illustrates an exemplary server, according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet. In general, with the development and increasing prevalence of the IoT, numerous heterogeneous IoT devices (e.g., millions or more) that provide different functionalities may need to interact with environmental surroundings and other proximal IoT devices (e.g., based on location, temporal criteria, other suitable contexts), among other things, to collect and analyze data and take appropriate actions. Furthermore, IoT devices may need to utilize related data and other information from other IoT devices that may not necessarily be in proximity thereto to improve performance. For example, traffic and weather sensor IoT devices may generate traffic and weather data and a vehicle IoT device may desire access to that traffic and weather data to appropriately adjust a route in the event that bad traffic or weather conditions may exist. Accordingly, as will be described in further below, various IoT devices that are organized or otherwise formed into different IoT networks can use a publish-subscribe messaging model and/or automatically expand social networks associated therewith to find relevant information from other IoT devices that can improve performance and effectiveness.

Figure 5:
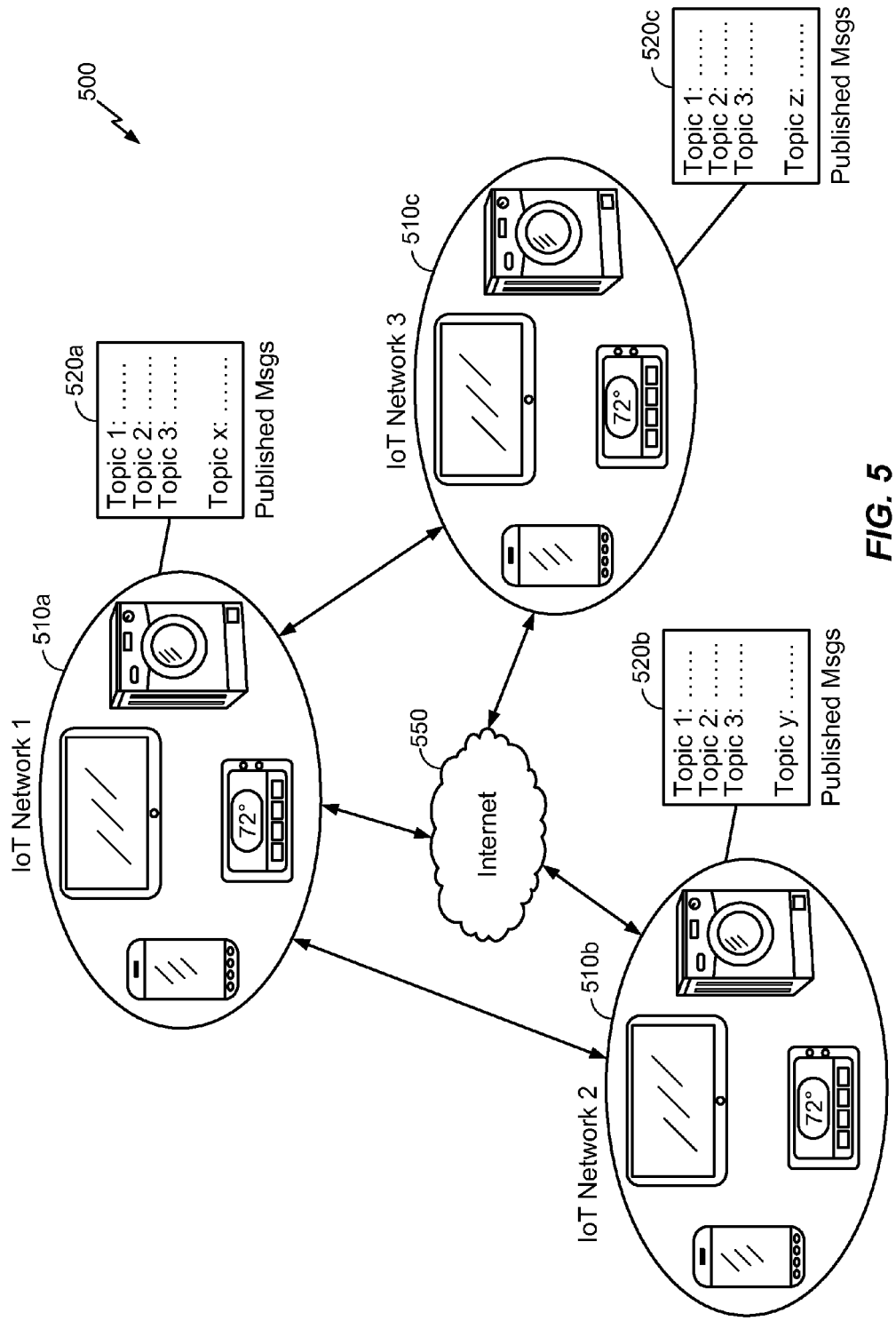
FIG. 5 illustrates an exemplary high-level system architecture of a communication system that may support an IoT device publish-subscribe messaging model according to various aspects of the disclosure.

More particularly, according to one embodiment, FIG. 5 illustrates an exemplary high-level system architecture of a communication system 500 that may support the publish-subscribe messaging model that IoT devices can use to find relevant information. For example, in one embodiment, IoT devices in proximity to one other (e.g., based on location, temporal characteristics, or other suitable contexts) may form various IoT networks 510a, 510b, 510c, etc. that may connect to one another directly or indirectly through an appropriate intermediate communication network 550 (e.g., the Internet). Furthermore, as shown in FIG. 5, certain IoT networks 510 may connect to one another directly (e.g., IoT network 510a has direct connections with IoT network 510b and IoT network 510c) and certain IoT networks 510 may alternatively and/or additionally connect to one another indirectly (e.g., IoT network 510a has indirect connections with IoT network 510b and IoT network 510c through the Internet 550 in addition to the direct connection with IoT network 510b and IoT network 510c, IoT network 510b has an indirect connection with IoT network 510c through the Internet 550 in addition to the direct connection with IoT network 510a, and IoT network 510c has an indirect connection with IoT network 510b through the Internet 550 in addition to the direct connection with IoT network 510a). However, those skilled in the art will appreciate that any suitable communication interface or communication network may be used to connect the various IoT networks 510.

In one embodiment, IoT devices within the IoT networks 510a-510c may publish status updates that relate to certain topics 520a-520c to the outside world over the Internet 550 or to another directly connected IoT network 510. For example, as shown in FIG. 5, each IoT network 510 may publish the status updates over the Internet 550, IoT network 510a may further publish status updates to directly connected IoT networks 510b and 510c, and IoT networks 510b and 510c may further publish status to directly connected IoT network 510a. In one embodiment, an IoT device from a particular IoT network 510 that has interest in published data can then subscribe to one or more relevant topics 520 and thereby receive regular status updates from IoT devices in another IoT network 510. As such, subscriptions to data published from other IoT devices can be used to dynamically adjust actions or other suitable decisions that the subscribing IoT devices may initiate. Additionally, IoT devices may use the publish-subscribe messaging model to discover other IoT devices that publish relevant information based on related information that may be known a-priori (e.g., an IoT vehicle device in IoT network 510b may know a travel route in advance and therefore discover other IoT devices in IoT network 510a and/or IoT network 510c that publish information relevant to the known travel route and subscribe to status updates that the discovered IoT devices publish). As such, the publish-subscribe messaging model may essentially implement social networking capabilities (e.g., the Twitter "following" model) to enable IoT devices in the communication system 500 to subscribe to data feeds that other IoT devices publish and in which the IoT devices may have interest.

Furthermore, in one embodiment, the status data that certain IoT devices publish may be managed in a distributed manner within each IoT network 510, which may provide the publish-subscribe messaging model with scalability that can accommodate many IoT devices (e.g., millions or more) within the communication system 500. For example, a particular IoT network 510 may designate a group owner or manager IoT device to publish the status updates that all individual IoT devices located therein generate. In a similar respect, the designated group owner or manager IoT device may receive all the status updates to which the individual IoT devices located therein have subscribed and then appropriately forward or otherwise route the received status updates to the individual IoT devices that have subscribed thereto. In another example, one or more individual IoT devices in the IoT network 510 may publish status updates and receive status updates to which the individual IoT devices have subscribed over communication interfaces dedicated thereto. However, those skilled in the art will appreciate that the above-mentioned arrangements to manage publishing and subscribing to the messages 520 relating to certain topics are exemplary only, in that any particular IoT network 510 may manage publishing and/or subscribing to the messages 520 relating to status updates on certain topics in a distributed manner, a centralized manner, a hybrid distributed-centralized manner, or any suitable combination thereof (e.g., a default configuration may have the group owner or manager manage the publications and subscriptions in a centralized manner and the default configuration may be automatically changed to a distributed model if the group owner or manager loses connectivity, experiences communication bottlenecks, etc.).

In one exemplary use case, a particular IoT network (e.g., IoT network 510a) may include one or more traffic and weather sensor IoT devices that can regularly publish messages 520a that include status updates on traffic and weather topics 520a at the associated local IoT network 510a. As such, any car IoT device or other IoT device that crosses a route in proximity to the traffic and weather sensor IoT devices located therein or otherwise has interest in traffic and/or weather in an area that corresponds to the IoT network 510a that includes the traffic and weather sensor IoT devices can therefore subscribe to the relevant traffic and weather topics 520a in order to receive status update from the traffic and weather sensor IoT devices therein. For example, a user may enter an appointment and corresponding location into a calendar application on a mobile phone IoT device and subscribe to messages 520a relating to the traffic and weather topics 520a published at the local IoT network 510a to plan a route to the appointment in advance (e.g., if the status updates relating to the traffic and weather topics 520a indicate poor traffic or weather conditions, an alternate route may be chosen in advance, or the car IoT device may automatically and dynamically alter an existing route to avoid the poor traffic or weather conditions based on messages 520a that relate to the traffic and weather topics 520a published at the local IoT network 510a).

In another exemplary use case, a particular IoT network (e.g., IoT network 510b) may include a refrigerator IoT device or another suitable home appliance IoT device that detects an internal problem or issue. The IoT device that detected the problem or issue can then subscribe and fetch relevant troubleshooting information 520 from a manufacturer website and attempt to resolve the problem or issue automatically. Alternatively (or additionally), the manufacturer network may subscribe to the home appliance IoT device and obtain information that may be used to perform remote diagnostics on the home appliance IoT device to troubleshoot or otherwise fix the problem or issue in response to determining that the home appliance IoT device published an appropriate status update to indicate that the problem or issue was detected. Furthermore, if the home appliance IoT device cannot resolve the problem or issue automatically using the troubleshooting information 520 obtained from the manufacturer website, the home appliance IoT device may fetch customer service data 520 from the manufacturer website and automatically schedule a repair or make arrangements to have customer service to contact the user. Alternatively, in one embodiment, the customer service data 520 may be fetched to schedule repairs or arrange to have customer service contact the user without first attempting to resolve the issue using the website troubleshooting information 520. In still another exemplary use case, if appropriate permissions have been granted and security measures are enforced, the manufacturer may subscribe to the home appliance IoT device to collect usage statistics, efficiency statistics, or other appropriate information that the manufacturer can subject to appropriate analytic processing.

In another exemplary use case, a user may be interested in purchasing certain products (e.g., a new car, furniture, etc.) or purchasing certain services (e.g., gutter cleaning, lawn maintenance, etc.), wherein a home automation controller IoT device may obtain or otherwise be provided with the products or services in which the user has expressed interest. The home automation controller IoT device may then subscribe to one or more message feeds 520 from relevant stores, vendors, or other businesses that sell the desired products or services and attempt to find the best price over a particular time period and/or automatically purchase the products or services based on the best price that was found over the time period. Another shopping example may include a refrigerator IoT device subscribing to message feeds 520 from different grocery stores and ordering groceries from the particular store that has the best overall pricing and quality or ordering different groceries in a shopping list from different grocery stores to the extent that different stores may have better or worse prices and/or quality with respect to different items. In still another example, a car IoT device can subscribe to deals, incentives, special offers, or other suitable message feeds 520 that relate to car detailing, satellite radio subscriptions, tires, or any other suitable product or service that has relevance to operating, maintaining, or otherwise using the car IoT device.

In another exemplary use case, when a user has upcoming travel plans, the user may have a mobile phone IoT device that knows information associated with the upcoming travel plans based on information that the user may have entered into a calendar application. As such, the mobile phone IoT device can subscribe to message feeds 520 from one or more IoT networks 510 in proximity to the travel destination (e.g., message feeds 520 relating to topics that include local weather, events, restaurants, etc.). Based on the information received in the message feeds 520 from the IoT networks 510 in proximity to the travel destination, the mobile phone IoT device can then provide suggestions to the user (e.g., what to pack, places to visit, etc.).

Figure 6:
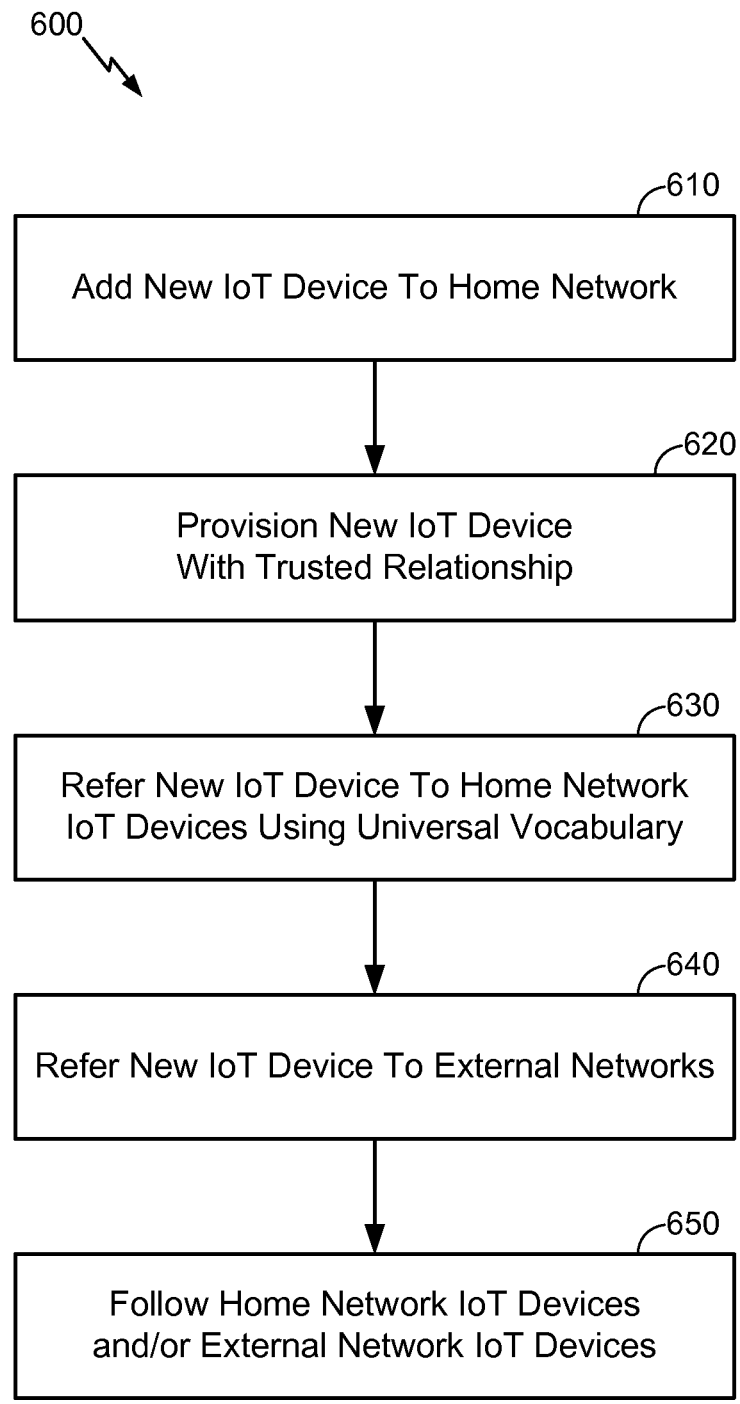
FIG. 6 illustrates an exemplary method for automatically expanding an IoT device social network according to various aspects of the disclosure.

According to another aspect of the disclosure, FIG. 6 illustrates an exemplary method 600 that may be used to automatically expand a social network associated with one or more IoT devices. More particularly, in one embodiment, one or more IoT devices may perform the method 600 illustrated in FIG. 6 to leverage common social networking capabilities (e.g., refer, follow, like, publish, subscribe, etc.) to interact and find relevant information from other IoT devices that can be used to improve performance and effectiveness, wherein the social networking capabilities may include providing referrals to IoT devices that become new members in an IoT network to automatically expand the social network that can be used to interact with other IoT devices and obtain relevant information in a secure and trusted manner based on permission, need, or other criteria. For example, an IoT device may follow another IoT device and thereby subscribe to certain events, status updates, environmental data, analytics, or other suitable information that the other IoT device publishes (e.g., using the publish-subscribe messaging model described above). Accordingly, as will be described in further detail herein, the method 600 shown in FIG. 6 may generally introduce an IoT device to one or more designated IoT devices that have a "trusted" status such that the IoT device introduced to the one or more trusted IoT devices may then use common social networking capabilities to automatically expand the social network associated therewith rather than having to perform complex processes to manually configure communication between all IoT devices that may need to interact.

More particularly, in one embodiment, in response to adding a new IoT device to a home IoT network or otherwise registering the new IoT device on the home IoT network, the new IoT device may be added to the home IoT network at block 610, wherein the new IoT device may then be provisioned with a trusted relationship at block 620. For example, in one embodiment, to provision the trusted relationship to the new IoT device, the new IoT device may be paired with or otherwise introduced to another secure and trusted IoT device in the home IoT network (e.g., a manager or group owner associated with the home IoT network). In one embodiment, the new IoT device and the trusted IoT device may then learn relevant information about one another based on information portfolios associated therewith, which may be expressed using a universal IoT device vocabulary. In one embodiment, the universal IoT device vocabulary may provide a generic, adaptive, and extensible universal schema that can define any suitable facet that relates to IoT devices (e.g., schema values can evolve or otherwise adapt based on learning from environmental surroundings and discovered interactions among IoT devices, and new schema elements may be added to extend the existing IoT device vocabulary). For example, in one embodiment, the universal IoT device vocabulary may express the information portfolios according to schema elements that may include, among other things, one or more attributes (e.g., a globally unique identifier, make, model, type, version, etc.), supported inputs (e.g., voltage, amperage, gallons, BTUs, etc.), supported outputs (e.g., watts, temperature, area-units, volume-units, speed, etc.), supported capabilities (e.g., start, stop, shutdown, hibernate, standby, reset, introduce, etc.), supported communication methods (e.g., Bluetooth, Wi-Fi, Infrared, Near-Field Communication, Shortwave Radio, etc.), current status (e.g., queries or subscriptions from other IoT devices and/or IoT networks), active associations (e.g., following IoT devices, followed IoT devices, and corresponding relation types and association ranks), authorization tokens (e.g., authentication mechanisms), and environment parameters (e.g. operating temperature, range of voltages, etc.).

As such, in response to the new IoT device and the trusted IoT device learning relevant information about one another based on the information portfolios associated therewith, the trusted IoT device may refer the new IoT device to one or more IoT devices in the home IoT network at block 630 based on the information portfolio associated with the new IoT device. Furthermore, in one embodiment, the new IoT device may be referred to one or more external IoT networks from a "doorkeeper" IoT device at block 640, wherein the doorkeeper IoT device may be the trusted IoT device initially introduced to the new IoT device, the manager or group owner associated with the home IoT network, or another secure and trusted IoT device in the home IoT network. For example, in one embodiment, the external IoT networks to which the new IoT device receives referrals may correspond to a neighbor IoT network, a family IoT network, or any other suitable IoT network (e.g., as described in further detail above with reference to FIG. 5). In one embodiment, at block 650, the new IoT device may then join certain external IoT networks based on the referrals from the doorkeeper IoT device, follow one or more IoT devices in the home IoT network (e.g., based on the referrals provided at block 630) and/or follow one or more IoT devices in the external IoT networks that the new IoT device joined (e.g., based on the referrals provided at block 640). Additionally, the referral processes performed at blocks 630, 640, and/or 650 may not be a one-time event. For example, after the new IoT device has been paired with the trusted IoT device, the trusted IoT device may further refer one or more other IoT devices to the new IoT device based on the information portfolio associated with the new IoT device. Furthermore, if certain status information (e.g., environmental information) subsequently changes and the trusted IoT device determines that the new IoT device should follow, become friends with, or otherwise subscribe to an information feed associated with other IoT devices, additional relationships may be provisioned and the process may dynamically continue in this manner based on various status changes or other suitable criteria. Accordingly, the new IoT device may only be introduced to the trusted IoT device and then build friend relationships automatically and dynamically based on appropriate criteria or other suitable factors. Furthermore, in one embodiment, the social network associated with one or more IoT devices may be modified to "defriend" certain other IoT devices (e.g., if IoT device A has been introduced to IoT device B, IoT device B may defriend IoT device C, for example if all relevant information that IoT device C provides can be obtained from IoT device A, and IoT device B may similarly recommend a defriend request to other IoT devices).

As such, the new IoT device may join the home IoT network and/or any external IoT networks and follow other IoT devices located therein without manual configuration or interruption, wherein any and/or all IoT devices that join the home IoT network may follow the same trend to continually and automatically expand the social network without manual configuration or interruption. Among other advantages, the framework that the method 600 shown in FIG. 6 provides to automatically expand an IoT device social network may enable heterogeneous IoT devices to follow analytics and other relevant information that other IoT devices publish and learn and appropriately react to patterns that followed IoT devices employ. For example, if a user purchases a new coffee machine IoT device, the user may pair the coffee machine IoT device with only one IoT device in the home IoT network (e.g., a home controller IoT device or other manager IoT device), which may provide the coffee machine IoT device with one or more referrals that may be used to pair the coffee machine IoT device with any other relevant IoT devices based on the existing social network in the home IoT network (e.g., to define a friend or following relationship). In another example, if a seismometer IoT device detects an earthquake within an external IoT network appropriately connected to the home IoT network, a message that includes a status update corresponding to the earthquake may be virally transmitted to a household gas stove IoT device that then automatically shuts down to prevent an explosion or other damage that could potentially have catastrophic or costly consequences. Accordingly, rather than manually configuring communication interfaces between different IoT devices that may need to interact, the automatic social network expansion framework described above may be used to introduce an IoT device to one or more trusted IoT devices and use common social networking capabilities to automatically expand the social network used to find relevant information.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for social networking among Internet of Things (IoT) devices, comprising:
    transmitting, by a first IoT device, a request to register the first IoT device on a home IoT network to at least one trusted IoT device on the home IoT network, wherein the transmitted request to register the first IoT device comprises one or more schema elements to indicate one or more attributes associated with the first IoT device;
    receiving, at the first IoT device, a referral to one or more relevant IoT devices from the at least one trusted IoT device, wherein the at least one trusted IoT device provides the referral to the first IoT device based at least in part on the one or more attributes associated with the first IoT device in response to the transmitted request to register on the home IoT network; and
    subscribing, by the first IoT device, to a data feed from the one or more relevant IoT devices based at least in part on messages published via the data feed comprising status updates about data relevant to an operational state at the first IoT device.

2. The method recited in claim 1, wherein the one or more relevant IoT devices are located in one or more of the home IoT network, an external IoT network directly connected to the home IoT network, or an external IoT network indirectly connected to the home IoT network through one or more intermediate networks.

3. The method recited in claim 1, further comprising:
    receiving, at the first IoT device, the messages published via the data feed from the one or more relevant IoT devices, wherein the first IoT device receives the published messages from at least one of the one or more relevant IoT devices or a manager IoT device that receives the published messages from the one or more relevant IoT devices and routes the published messages to subscribing IoT devices within the home IoT network.

4. The method recited in claim 1, further comprising:
    publishing, by the first IoT device, one or more messages associated with one or more topics that are relevant to the operational state at the first IoT device, wherein the first IoT device publishes the one or more messages using one or more of a local interface or a remote interface associated with a manager IoT device that routes the published messages to subscribing IoT devices within the home IoT network and external IoT networks.

5. The method recited in claim 1, further comprising:
determining the one or more relevant IoT devices based on a correlation between the one or more attributes associated with the first IoT device and one or more topics associated with the messages published via the data feed from the one or more relevant IoT devices.

6. The method recited in claim 1, further comprising:
discovering one or more additional IoT devices having a friend relationship with the one or more relevant IoT devices; and
subscribing to a second data feed from the one or more additional IoT devices.

7. The method recited in claim 1, further comprising:
discovering one or more additional IoT devices that publish messages associated with one or more topics that are relevant to the operational state at the first IoT device, the one or more topics having relevance to the operational state at the first IoT device based on one or more of a current state or a planned state associated with the first IoT device; and
subscribing to a second data feed from the one or more additional IoT devices.

8. The method recited in claim 1, further comprising:
adjusting, at the first IoT device, one or more actions associated with the first IoT device based on the messages published via the data feed from the one or more relevant IoT devices.

9. The method recited in claim 1, further comprising:
determining, at the first IoT device, one or more additional IoT devices registered on the home IoT network that have been referred to the first IoT device based on a correlation between the one or more attributes associated with the first IoT device and one or more attributes associated with the one or more additional IoT devices; and
publishing, by the first IoT device, one or more messages associated with one or more topics that are relevant to the operational state at the first IoT device, wherein the one or more additional IoT devices referred to the first IoT device subscribe to and receive the one or more published messages relevant to the operational state at the first IoT device.

10. The method recited in claim 9, further comprising:
unsubscribing from the data feed from the one or more relevant IoT devices;
determining that the one or more additional IoT devices referred to the first IoT device are subscribed to the data feed from the one or more relevant IoT devices; and
transmitting, from the first IoT device the one or more additional IoT devices, a recommendation to unsubscribe from the data feed from the one or more relevant IoT devices.

11. The method recited in claim 1, wherein the one or more schema elements used to indicate the one or more attributes associated with the first IoT device are defined according to an IoT device vocabulary to express an information portfolio that defines one or more device-specific facets associated with the first IoT device.

12. An apparatus, comprising:
a transceiver configured to:
transmit a request to register the apparatus on a home Internet of Things (IoT) network to at least one trusted IoT device on the home IoT network, wherein the transmitted request comprises one or more schema elements to indicate one or more attributes associated with the apparatus; and
receive a referral to one or more relevant IoT devices from the at least one trusted IoT device, wherein the at least one trusted IoT device provides the referral based at least in part on the one or more attributes associated with the apparatus in response to the apparatus registering on the home IoT network; and
at least one processor, coupled to the transceiver, and configured to subscribe to a data feed from the one or more relevant IoT devices based at least in part on messages published via the data feed comprising status updates about data relevant to an operational state at the apparatus.

13. The apparatus recited in claim 12, wherein:
the transceiver is further configured to receive the messages published via the data feed from at least one of the one or more relevant IoT devices or a manager IoT device configured to receive the published messages from the one or more relevant IoT devices and route the published messages to subscribing IoT devices within the home IoT network; and
the at least one processor is further configured to adjust one or more actions based on the messages published via the data feed from the one or more relevant IoT devices.

14. The apparatus recited in claim 12, wherein the at least one processor is further configured to:
publish one or more messages associated with one or more topics that are relevant to the operational state at the apparatus.

15. The apparatus recited in claim 12, wherein the at least one processor is further configured to:
determine the one or more relevant IoT devices based on a correlation between the one or more attributes and one or more topics associated with the messages published via the data feed from the one or more relevant IoT devices.

16. The apparatus recited in claim 12, wherein the at least one processor is further configured to:
discover one or more additional IoT devices having a friend relationship with the one or more relevant IoT devices; and
subscribe to a second data feed from the one or more additional IoT devices.

17. The apparatus recited in claim 12, wherein the at least one processor is further configured to:
discover one or more additional IoT devices that publish messages associated with one or more topics that are relevant to the operational state at the apparatus, the one or more topics having relevance to the operational state at the apparatus based on one or more of a current state or a planned state associated with the apparatus;
subscribe to a second data feed from the one or more additional IoT devices.

18. The apparatus recited in claim 12, wherein the at least one processor is further configured to:
determine one or more additional IoT devices registered on the home IoT network that have been referred to the apparatus based on a correlation between the one or more attributes associated with the apparatus and one or more attributes associated with the one or more additional IoT devices; and
publish one or more messages associated with one or more topics that are relevant to the operational state at the apparatus, wherein the one or more additional IoT devices referred to the apparatus are configured to subscribe to and receive the one or more published messages relevant to the operational state at the apparatus.

19. The apparatus recited in claim 18, wherein:
the at least one processor is further configured to unsubscribe from the data feed from the one or more relevant IoT devices; and
the transceiver is further configured to transmit, to the one or more additional IoT devices, a recommendation to unsubscribe from the data feed from the one or more relevant IoT devices.

20. The apparatus recited in claim 12, wherein the one or more schema elements used to indicate the one or more attributes associated with the apparatus are defined according to an IoT device vocabulary to express an information portfolio that defines one or more device-specific facets associated with the apparatus.

21. An Internet of Things (IoT) device, comprising:
means for transmitting, to at least one trusted IoT device on a home IoT network, a request to register the IoT device on the home IoT network, wherein the transmitted request comprises one or more schema elements to indicate one or more attributes associated with the IoT device;
means for receiving a referral to one or more relevant IoT devices from the at least one trusted IoT device, wherein the at least one trusted IoT device provides the referral based at least in part on the one or more attributes associated with the IoT device in response to the transmitted request to register on the home IoT network; and
means for subscribing to a data feed from the one or more relevant IoT devices based at least in part on messages published via the data feed comprising status updates about data relevant to an operational state at the IoT device.

22. A non-transitory computer-readable storage medium having computer-executable instructions recorded thereon, wherein executing the computer-executable instructions on an Internet of Things (IoT) device causes the IoT device to:
transmit, to at least one trusted IoT device on a home IoT network, a request to register the IoT device on the home IoT network, wherein the transmitted request comprises one or more schema elements to indicate one or more attributes associated with the IoT device;
receive a referral to one or more relevant IoT devices from the at least one trusted IoT device, wherein the at least one trusted IoT device provides the referral based at least in part on the one or more attributes associated with the IoT device in response to the transmitted request to register on the home IoT network; and
subscribe to a data feed from the one or more relevant IoT devices based at least in part on messages published via the data feed comprising status updates about data relevant to an operational state at the IoT device.

* * * * *